FREQUENCY SPACING IN TWO-TONE CARRIER SYSTEMS

Filed Sept. 1, 1950 4 Sheets-Sheet 1

INVENTOR
W. A. PHELPS
BY H. A. Burgess
ATTORNEY

FREQUENCY SPACING IN TWO-TONE CARRIER SYSTEMS

Filed Sept. 1, 1950

4 Sheets-Sheet 2

INVENTOR
W. A. PHELPS
BY H. A. Burgess
ATTORNEY

INVENTOR
W. A. PHELPS
BY H. A. Burgess
ATTORNEY

INVENTOR
W. A. PHELPS
BY
H. A. Burgess
ATTORNEY

Patented Apr. 20, 1954 2,676,203

UNITED STATES PATENT OFFICE 2,676,203

FREQUENCY SPACING IN TWO-TONE CARRIER SYSTEMS

Walter A. Phelps, Madison, N. J., assignor to Bell Telephone Laboratories, Incorporated, New York, N. Y., a corporation of New York Application September 1, 1950, Serial No. 182,650

5 Claims. (Cl. 178—66)

This invention relates to carrier-communication systems and, more particularly, to a frequency allocation plan for a two-tone carrier telegraph system using different frequencies for marking and spacing signals.

A principal object of the invention is to improve the signal transmission quality of a two-tone carrier telegraph system.

It is sometimes desirable to use a two-tone carrier system in preference to a true frequency shift system. For example, it may be desired to convert an existing single tone amplitude modulated or "on-off" carrier telegraph system to two-tone operation. In the past, it has generally been thought that the signal transmission quality of a two-tone system is inherently poorer than the quality of a true frequency shift system. Efforts to reduce the signal distortion in two-tone systems have not succeeded to any appreciable extent primarily because the cause of this distortion has not been fully appreciated. Applicant, however, has succeeded in recognizing the causes of this distortion and has found that the transmission and signal quality advantages of true frequency shift operation may be equaled in a two-tone system by a proper spacing of the carriers employed for marking and spacing signals.

In accordance with an illustrative embodiment of the invention, to be described later in detail, two-tone carrier telegraph signals are transmitted by two interconnected modulators, marking and spacing tones being alternately transmitted under the control of a single sending loop. At the receiver, the marking and spacing tones belonging to one two-tone channel are selected by filters and passed through a common limiter. The marking and spacing tones are then separated by filters and passed through separate amplifier-detectors. The outputs of these detectors may be combined differentially through a relay or other load circuit, or they may be made to operate a vacuum tube load circuit in such a manner as to produce full marking current when a marking tone is received or no current when a spacing signal is received, an operating condition normally required for teletypewriters. A circuit designed to operate in the latter manner is disclosed in a copending application of T. A. Jones, Serial No. 181,951, filed August 29, 1950, now Patent No. 2,644,036.

A feature of the invention is that while two-tone systems, as usually constructed, with separate oscillator supplies produce signals of high distortion, the signal distortion can be reduced to a point where it is comparable with that produced in true frequency-shift systems by properly selecting the frequencies to be paired in one channel instead of merely using adjacent available frequencies, as has generally been the practice.

This and other features and objects of the invention may be better understood from a consideration of the following detailed description when read in accordance with the attached drawings and tables, in which.

In the discussion which follows, it is assumed that each marking frequency and each spacing frequency is obtained from a separate vacuum tube oscillator. These oscillators are tuned to emit frequencies which are odd multiples of a "base" frequency, since, as is known, certain advantages result from the use of frequencies which are so related. Specifically, these frequencies extend from 425 cycles to 2295 cycles, inclusive, at 170-cycle intervals and are the odd multiples of 85 cycles beginning with the 5th. The operation of the system described is not dependent on these particular numerical values; these have been chosen as representative, and a considerable number of measurements and calculations have been made using such an arrangement. It is also assumed that these oscillators are locked through their grid circuits to a common base frequency oscillator (85 cycles in the illustration used herein) in order that all frequencies used may be exact multiples of a common base frequency. This provision is not essential to the operation of the system but yields an additional advantage which will be discussed later.

Figure 1:
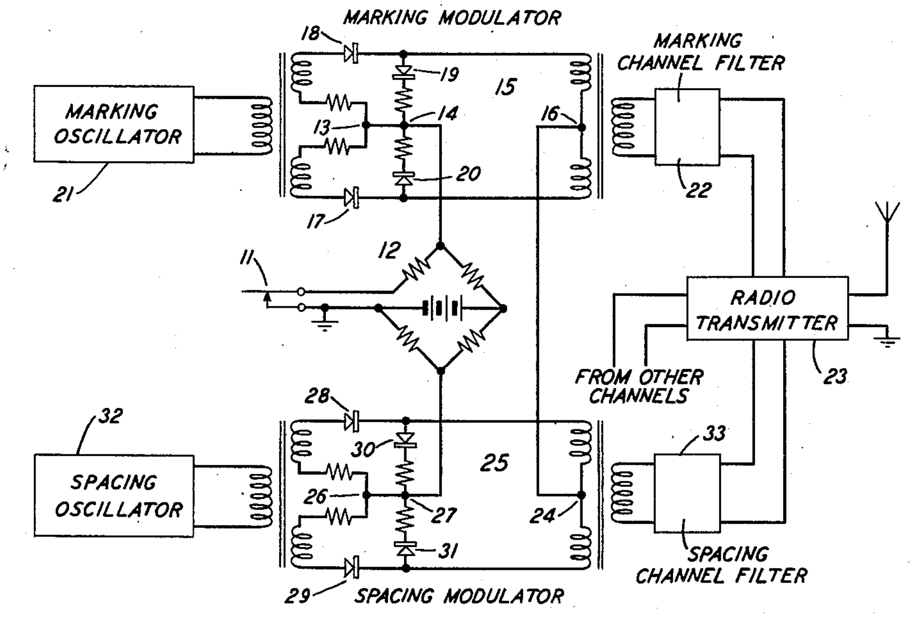
Fig. 1 shows transmitting circuits for sending two-tone carrier signals.

Referring now to Fig. 1, the essential principles of the sending modulator will be described. A sending device, such as a telegraph key or a teletypewriter sending keyboard, is represented by the open-and-close contact 11. When the key is closed, the resistance bridge 12 is unbalanced in such a direction as to apply a positive potential to points 13 and 14 of the marking modulator 15 and negative potential to point 16. This will cause varistors 17 and 18 to have low impedance and varistors 19 and 20 to have high impedance. These conditions will allow carrier current from the marking oscillator 21 to flow outward, with little attenuation, through the marking channel filter 22 to the radio transmitter 23. Meanwhile, a positive potential will be applied to point 24 of the spacing modulator 25 and a negative potential to points 26 and 27. This will cause varistors 28 and 29 to have high impedance and varistors 30 and 31 to have low impedance. These conditions will effectively block the flow of spacing carrier current from the spacing oscillator 32. When the contact at key 11 is opened, all the conditions described above are reversed; the bridge 12 is unbalanced in the opposite direction, and all the potentials referred to above are reversed. With this condition, only spacing carrier current is allowed to flow through the spacing channel filter 33 to the radio transmitter 23. Thus, as key contact 11 is alternately opened and closed, marking and spacing carrier current are alternately released to the radio transmitter 23, thereby transmitting the desired telegraph signals.

Figure 2:
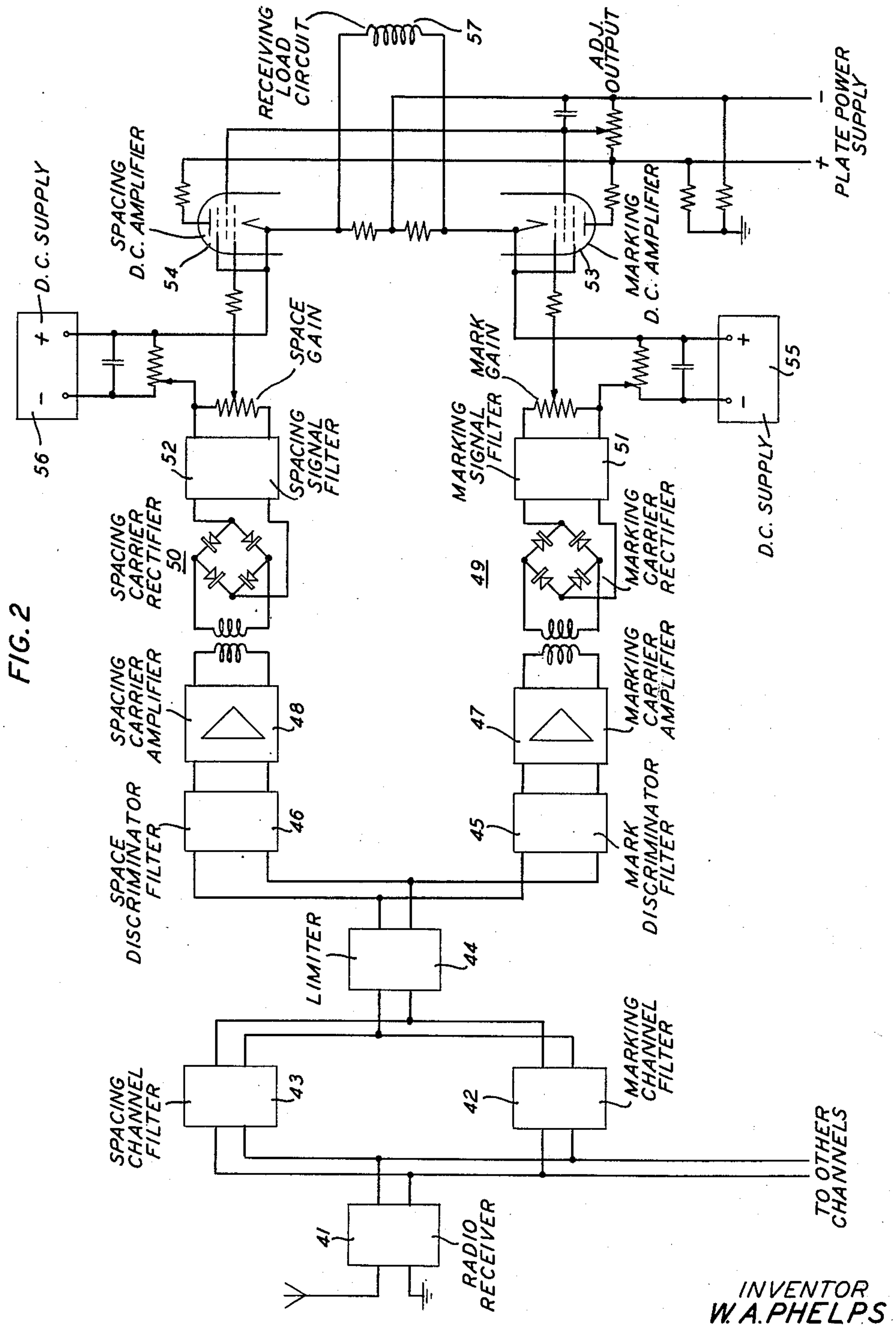
Fig. 2 shows the corresponding receiving circuits.

Referring next to Fig. 2, the principles of the receiving circuits will be described. Signals comprising marking and spacing carrier currents from the radio receiver 41 are selected by the marking channel filter 42 and by the spacing channel filter 43, respectively. These currents then pass through a common current limiter 44, which may, for example, be of the type disclosed in E. Peterson Patent 1,830,240, dated November 3, 1931. The telegraph signals, in passing through the channel filters 42 and 43, have been considerably rounded. The limiter 44 transforms them into square signals, and it is this property of the limiter which gives rise to signal distortion in two-tone systems using separate carrier supply oscillators for marking and spacing tones. This matter will be discussed more in detail below.

The marking and spacing signal currents are again separated by means of the mark discriminator filter 45 and by the space discriminator filter 46, respectively. These signal currents are then separately amplified by the amplifiers 47 and 48 and rectified by the varistor rectifiers 49 and 50. Following each rectifier is a low-pass filter, 51 and 52, to pass the signal frequencies and to suppress the carrier and any of its components passed by its associated rectifiers 49 or 50. The signal currents then pass to the marking direct-current amplifier 53 and to the spacing direct-current amplifier 54, respectively. Under the influence of the negative direct-current potential supplies 55 and 56, tubes 53 and 54 are normally operated below cut-off so that with no incoming space or mark signal current, no current will flow in the plate circuits of these tubes. With incoming marking current, the negative grid bias of tube 53 will be overcome, and current will flow in the plate circuit of the marking direct-current amplifier tube. Similarly, upon the receipt of a spacing signal, the marking direct-current amplifier tube 53 will be cut off, and current will flow in the plate circuit of the spacing direct-current amplifier tube 54. It can be seen from Fig. 2 that when current flows in the marking tube and then in the space tube, a current will flow through the receiving load circuit 57 first in one direction and then in the other. This load circuit may, for example, be the relay winding or magnet coil of a teletypewriter or other electromagnetically operated recording or indicating device.

The description of the receiving circuit just given covers polar operation only, and this case has been used to establish the general principles of receiving circuit operation, as it is the simplest case. It is also possible to arrange the receiving circuit so that it will transmit to the receiving load circuit neutral signals, that is, current and no current to distinguish between marking and spacing signals, as described in the above-mentioned application of T. A. Jones. However, the principle of two-tone operation is not affected by the type of signal to be transmitted to the receiving load circuit.

Now that the principles of operation of the sending and receiving circuits have been set forth, the course of the telegraph signals through the receiving circuit will next be considered. Suppose the sending circuits of Fig. 1 are transmitting a stream of equally spaced dots. After passing over the circuit to the receiver in Fig. 2 and through the channel receiving filters, these dot signals will resemble in form those indicated in Fig. 3, lines A and B. Those in line A represent the dots in the marking channel, and those in line B represent the dots in the spacing channel. It is to be understood that these diagrams are amplitude-time representations of the signals. The rounded form of the carrier envelope is caused by the subtraction by the filters of the odd order components present in the original "square" signals.

Figure 3:
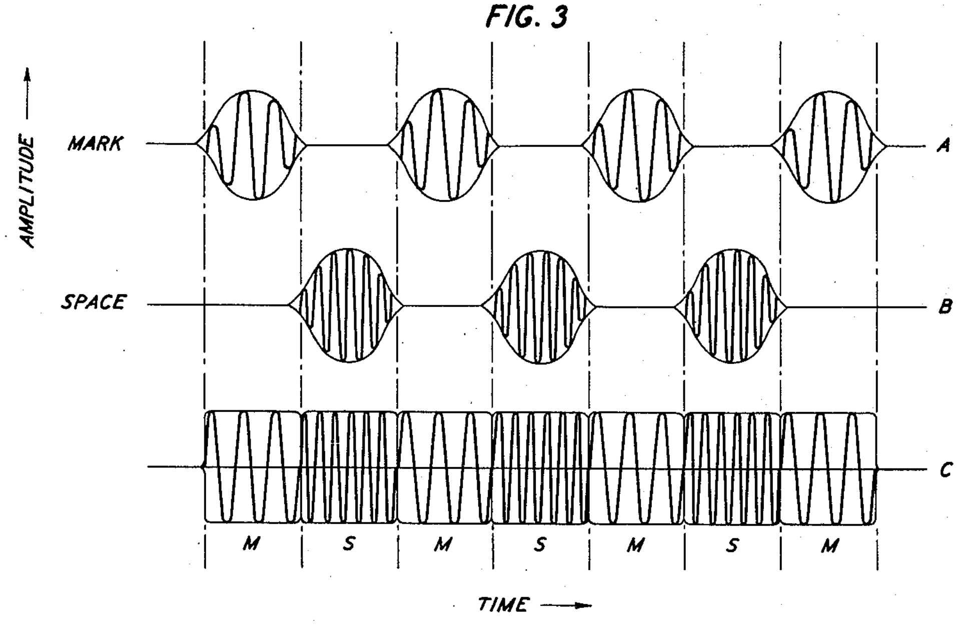
Fig. 3 shows the envelopes of signals before and after passing through the limiter.

When these signals have passed through the current limiter 44 in Fig. 2, they may be represented, on an amplitude-time basis, as in line C of Fig. 3. The effect of the limiter has been to "square up" the signals; that is, the odd order harmonics of the signal frequencies subtracted by the band filters through which the signals have passed have been restored, at least partially, by the limiter. The higher the gain of the current limiter, the more nearly the signal envelopes will approach the square form.

If we assume a stream of dot signals obtained by 100 per cent modulation of a sine wave carrier current $E \cos \omega t$ by unbiased square wave dots of frequency $$\frac{p}{2\pi}$$

the modulated wave can be represented by $$c=\frac{E}{2}\cos \omega t+\frac{E}{\pi}[\cos(\omega+p)t+\cos(\omega-p)t]$$
$$-\frac{E}{3\pi}[\cos(\omega+3p)t+\cos(\omega-3p)t]$$
$$+\frac{E}{5\pi}[\cos(\omega+5p)t+\cos(\omega-5p)t]\ \ldots,\ \text{etc.}$$

This will approximately represent the marking dots of line C in Fig. 3 and also the spacing dots of line C in Fig. 3, the only difference between the two being the angular velocity $\omega$ of the carrier frequency (different carrier frequencies are used in the mark and space channels). The relative amplitudes of the first few components in the modulated wave are set forth in Table I below.

*Table I*

| Component | Amplitude | Amplitude in Terms of the Carrier Component |
|---|---|---|
| Carrier component | $\frac{E}{2}$ | Unity. |
| Each 1st order side frequency | $\frac{E}{\pi}$ | −3.9 db. |
| Each 3rd order side frequency | $\frac{E}{3\pi}$ | −13.5 db. |
| Each 5th order side frequency | $\frac{E}{5\pi}$ | −17.9 db. |
| Each 7th order side frequency | $\frac{E}{7\pi}$ | −20.8 db. |
| Each 9th order side frequency | $\frac{E}{9\pi}$ | −23.0 db etc. |

Suppose we have a two-tone channel in which the marking frequency is 2125 cycles and the spacing frequency is 2295 cycles and examine the effect of the sidebands associated with a spacing signal. The situation is as shown in Fig. 4, in which $F_1$ represents the discrimination-frequency characteristic of the space discriminator filter following the limiter and $F_2$ represents the similar characteristic of the mark discriminator filter.

Figure 4:
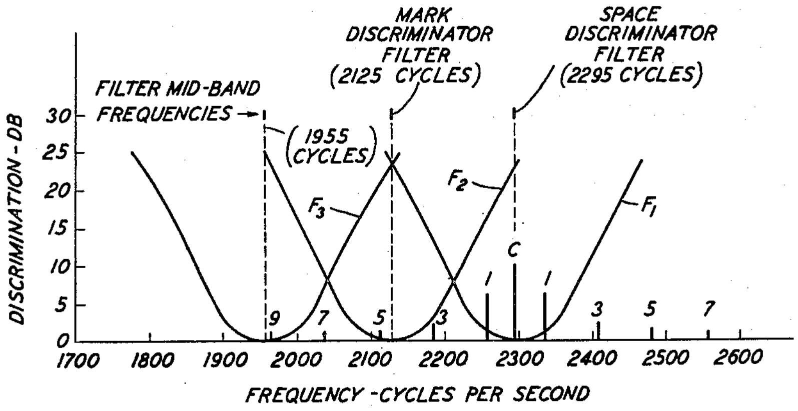
Fig. 4 shows the distribution of signal sideband frequencies.

If a stream of 37-cycle dots is being received, the signal sidebands of the spacing signals will be as represented in Fig. 4 by the numbered vertical lines. C is the carrier current at the mid-frequency of the filter pass band; the magnitude of C is arbitrary. The first order signal sideband on each side of C is represented by the vertical line carrying the number 1 and is 3.9 decibels below C in magnitude and occurs at 37 cycles on either side of C. The third order component occurs at 3×37 cycles on either side of C, and its magnitude in each case is 13.5 decibels below that of C. In a similar manner, the fifth, seventh, and ninth order components are shown by the appropriately numbered vertical lines.

It will be observed that the third order component of the spacing signal is attenuated approximately 13 decibels by the space discriminator filter so that it is not very effective in determining the shape of the spacing signal. However, it suffers only about 3 decibels attenuation by the mark discriminator filter. The third order component of the spacing signal is, therefore, more effective in shaping the marking signal than the spacing signal. However, its phase relation to the marking carrier is generally wrong for properly shaping the latter because the spacing and marking carrier currents are derived from different oscillators. Consequently, the third harmonic of the spacing signal frequency will operate generally to distort the shape of the marking signal. The same is true of the fifth order component of the spacing signal, which, as can be seen from Fig. 4, is substantially unattenuated by the mark discriminator filter. In evaluating this effect, it is important to understand that during the transition from mark to space, or from space to mark, both signals are present simultaneously; and it is at this transition time that any distorting effect on the signal shape is most troublesome because it is at this time that the load circuit operates from space to mark or vice versa.

If, instead of using a filter having the discriminator characteristic $F_2$ and a mid-band frequency of 2125 cycles as a mark discriminator filter (5 in Fig. 2), a filter having the discriminator characteristic $F_3$ and a mid-band frequency of 1955 cycles is used, it will be noticed by inspection of Fig. 4, that only the seventh, ninth, and eleventh harmonics of the spacing signal frequency can enter the latter filter ($F_3$) without considerable attenuation. Since these higher order components are already very small, very little distortion of the marking signal by the spacing signal will occur. Signal distortion has been measured at 100 words per minute operation with all possible pairings of 12 carrier frequencies, and the results are tabulated below in Table II.

*Table II*

| Channel Freq., C. P. S. | | Max. Distortion, percent | Channel Freq., C. P. S. | | Max. Distortion, percent | Channel Freq., C. P. S. | | Max. Distortion, percent |
|---|---|---|---|---|---|---|---|---|
| Mark | Space | | Mark | Space | | Mark | Space | |
| 425 | 595 | 23 | 765 | 1,445 | 8 | 1,275 | 1,785 | 6 |
| 425 | 765 | 10 | 765 | 1,615 | 8 | 1,275 | 1,955 | 7 |
| 425 | 935 | 9 | 765 | 1,785 | 6 | 1,275 | 2,125 | 5 |
| 425 | 1,105 | 12 | 765 | 1,955 | 8 | 1,275 | 2,295 | 6 |
| 425 | 1,275 | 7 | 765 | 2,125 | 11 | | | |
| 425 | 1,445 | 13 | 765 | 2,295 | 6 | 1,445 | 1,615 | 18 |
| 425 | 1,615 | 8 | | | | 1,445 | 1,785 | 7.5 |
| 425 | 1,785 | 8 | 935 | 1,105 | 19 | 1,445 | 1,955 | 5 |
| 425 | 1,955 | 9 | 935 | 1,275 | 8 | 1,445 | 2,125 | 5 |
| 425 | 2,125 | 6 | 935 | 1,445 | 6 | 1,445 | 2,295 | 6 |
| 425 | 2,295 | 9.5 | 935 | 1,615 | 7 | | | |
| | | | 935 | 1,785 | 7 | 1,615 | 1,785 | 20 |
| 595 | 765 | 20 | 935 | 1,955 | 8 | 1,615 | 1,955 | 5 |
| 595 | 935 | 7.5 | 935 | 2,125 | 5 | 1,615 | 2,125 | 4.5 |
| 595 | 1,105 | 9 | 935 | 2,295 | 6 | 1,615 | 2,295 | 4 |
| 595 | 1,275 | 8 | | | | | | |
| 595 | 1,445 | 9 | 1,105 | 1,275 | 19 | 1,785 | 1,955 | 17 |
| 595 | 1,615 | 10 | 1,105 | 1,445 | 8 | 1,785 | 2,125 | 6 |
| 595 | 1,785 | 7 | 1,105 | 1,615 | 5 | 1,785 | 2,295 | 4.5 |
| 595 | 1,955 | 13 | 1,105 | 1,785 | 7 | | | |
| 595 | 2,125 | 7.5 | 1,105 | 1,955 | 7 | 1,955 | 2,125 | 18 |
| 595 | 2,295 | 8 | 1,105 | 2,125 | 7.5 | 1,955 | 2,295 | 6 |
| | | | 1,105 | 2,295 | 8.5 | | | |
| 765 | 935 | 18 | | | | 2,125 | 2,295 | 16 |
| 765 | 1,105 | 8 | 1,275 | 1,445 | 20 | | | |
| 765 | 1,275 | 6 | 1,275 | 1,615 | 7 | | | |

Inspection of this table shows that with a spacing carrier frequency of 2295 cycles and with a marking frequency of 2125 cycles (last line in the table), the observed signal distortion was 16 per cent. When the marking frequency was dropped to 1955 cycles, the table shows (next to last line) a distortion of only 6 per cent, which illustrates experimentally the advantage cited above. So far, only the effect of the sidebands on the spacing signal in distorting the marking signal has been considered. The effect of the marking signal in distorting the spacing signal may be shown by the same reasoning, using the characteristics of Fig. 4.

A dotting speed of 37 cycles per second was used because the start-stop teletypewriter system uses a 7.41 unit code, and at a signaling speed of 100 words per minute, the maximum signaling frequency is 37 dot cycles per second. Of course, the transmission of miscellaneous signals of ordinary traffic does not consist of a stream of equally spaced dots and hence does not present a spectrum of signal frequencies like that shown in Fig. 4. The stream of equally spaced dots has been used in this discussion because it is the severest case; that is, the signal distortion is greatest in this case. The measurements tabulated in Table II were made with the transmission of miscellaneous signals such as are used in ordinary telegraph traffic.

Figure 5A:
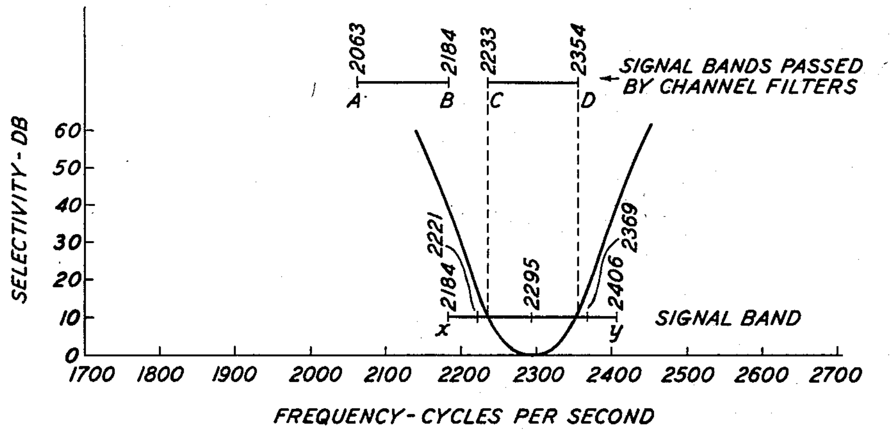
Figs. 5A through 5C show the history of mark and space signal bands in a two-tone system using carriers of 2125 cycles and 2295 cycles.

In addition to the direct "spill-over" of signal sideband into a closely spaced adjacent channel, there is a secondary effect due to the intermodulation of signal sidebands. Reference to Figs. 1 and 2 show that miscellaneous signals modulated on the carrier used pass through both a send-channel filter (22 or 33 in Fig. 1) and a receive-channel filter (42 or 43 in Fig. 2). A typical selectivity characteristic of two such filters added together is shown in Fig. 5A. On this characteristic at the 10-decibel point is shown the spacing carrier (2295 cycles) $\pm$ all frequencies up to the third harmonic of 37 cycles. This desirable band of signal frequencies is indicated by the line $xy$. The 10-decibel point on the filter characteristic has been chosen because modulation components produced by currents attenuated 10 decibels can, in general, be neglected in this study. The part of this band of frequencies which passes through the combined channel filters is indicated in the figure at CD.

The marking carrier (2125 cycles) with its signal sidebands similarly passes through two channel filters in series and emerges as the line AB in Fig. 5A. The shape of the send and receive filters in the 2125-cycle marking path have been assumed the same as in the 2295-cycle spacing path; this is approximately true in the practical case.

At a time of transition from mark to space or space to mark, in the two-tone system, both marking and spacing currents are present simultaneously in the current limiter. As the limiter is a strong modulator, it is important to examine what products can pass through the discriminator filters (45 and 46 in Fig. 2).

Figure 5B:
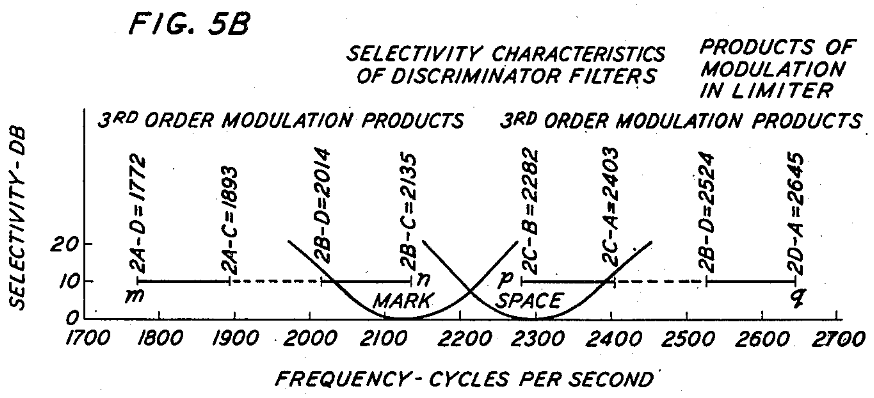

When the bands AB and CD pass through a modulator producing a symmetrical output wave, the products obtained are as shown in Fig. 5B. These extend from $m$ to $n$ and from $p$ to $q$. Every frequency from $m$ to $n$ and $p$ to $q$ does not appear, but discrete frequencies will be distributed at intervals between these limits. The lines indicating the modulation products have been drawn in arbitrarily at the 10-decibel point on the mark and space discriminator filters, but this is not to be taken to mean that this is an indication of their magnitude.

Figure 5C:
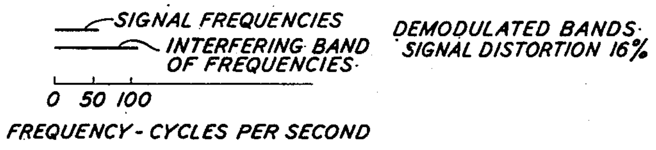

It can be seen that some third order products fall inside the pass bands of both discriminator filters and enter the demodulator. On demodulation, the situation is as shown in Fig. 5C. The important point is that the interfering band resulting from intermodulation of signal sidebands in the limiter completely overlaps the signal band; and as the phase relations between the two bands are random, they will, in general, beat with each other during a signal transition, causing distortion.

Figure 6:
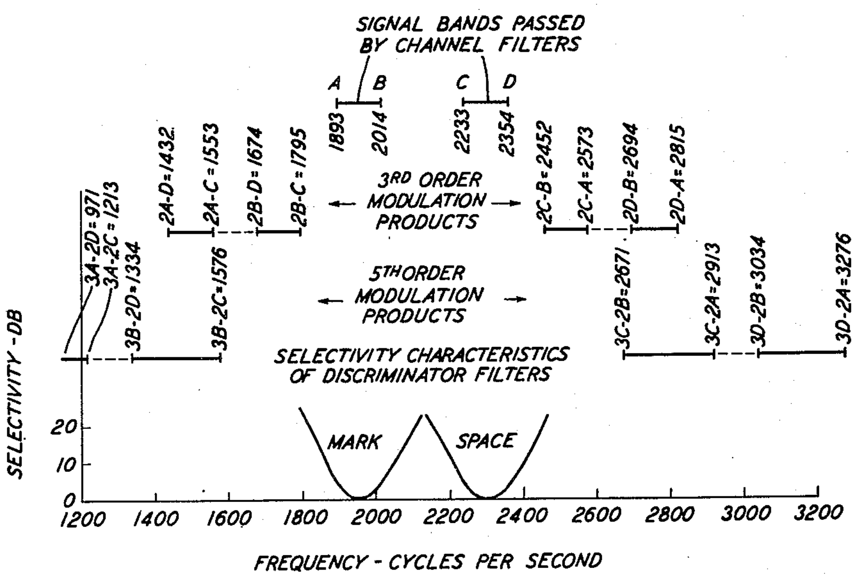
Fig. 6 shows the history of mark and space signal bands in a two-tone receiving circuit using carriers of 1955 cycles and 2295 cycles.

If the marking frequency is changed from 2125 cycles to 1955 cycles, leaving the spacing frequency at 2295 cycles, the products resulting from the intermodulation of sidebands will change their positions in the frequency spectrum. Again tracing the history of the signal bands in the receiving circuit, we find the situation as shown in Fig. 6. Now, no modulation components produced in the limiter, of the fifth order or below, lie within the bands of the discriminator filters below the point of 20 decibels discrimination. By shifting the marking frequency from 2125 cycles to 1955 cycles, not only has the direct leakage of sidebands from one channel to the other been avoided, as pointed out previously, but also the products of modulation of the signal sidebands in the limiter have been thrown outside the bands of the discriminator filters (45 and 46 in Fig. 2).

In the specific case just considered, the predominant effect is the direct overlap of signal sidebands first considered above, but the effect of intermodulation of sidebands in the absence of any appreciable overlap of sidebands can be seen by reference to Table II previously considered. An examination of this table shows that occasionally where the mark and space frequencies are so far apart that any appreciable effect from the direct overlap of sidebands is unlikely, the signal distortion will suddenly rise appreciably. For example, in the group of channel pairings of Table II above, using 765 cycles as the marking frequency, the 765–2125 cycle pair shows a marked rise in measured distortion, although these two frequencies are too far apart for any direct overlap of sidebands to occur.

The entire group of pairings, using 765 cycles as the marking frequency, were analyzed, using the method set forth on Fig. 6. The results of this analysis are shown in Table III below. It will be noted that even order products have been neglected. This has been done because the limiter has been so designated that with a sine wave input, the output is substantially a symmetrical square wave. Such a device will produce mainly odd order products of modulation.

*Table III*

| Channel Frequency (cycles per sec.) | | Max Distortion (percent) | Interfering Modulation Components Lying in Bands of Discriminator Filters | |
|---|---|---|---|---|
| Mark | Space | | Mark Filter | Space Filter |
| 765 | 935 | 18 | {3rd order<br>{5th order | 3rd order.<br>5th order. |
| 765 | 1,105 | 8 | | |
| 765 | 1,275 | 6 | | |
| 765 | 1,445 | 8 | 5th order | |
| 765 | 1,615 | 8 | do | |
| 765 | 1,785 | 6 | | |
| 765 | 1,955 | 8 | | 5th order. |
| 765 | 2,125 | 11 | 3rd order | Do |
| 765 | 2,295 | 6 | do | Do |

An inspection of Table III shows high signal distortion where the mark and space frequencies are close together or where low order products of modulation between signal sidebands fall in the bands of the mark or space discriminator filters or in the bands of both filters.

Looking at the last line of Table III and noticing that a third order product falls in the band of the mark discriminator filter and that a fifth order product falls in the band of the space discriminator filter, it would be reasonable to expect a higher distortion than 6 per cent. In this case, it will be observed that the two frequencies of the channel pair are exact multiples of each other; and the products of modulation from the limiter, if they lie in the pass bands of the discriminator filters, will have exactly the same frequency as the signal components when demodulated. These products of modulation will not necessarily be exactly in phase with the signal components, but whatever the phase difference may be, it will not change because the carrier oscillators are locked together by means of an 85-cycle base frequency oscillator, as previously mentioned. Therefore, there will be no beat between the demodulated signal frequencies and the demodulated products. These may shorten or lengthen both the marking and spacing signal, which may produce a bias, but this can be adjusted out and will not appear as a varying distortion of the signal.

If the oscillators are unlocked and allowed to drift apart slightly, the distortion will rise; measurements showed a rise of 3 or 4 per cent in distortion, but the oscillators used normally produce frequencies close to the desired value. For a considerable difference in frequency, the rise of distortion would have been larger.

From the analysis given above, supported by experimental data, it appears that given a group of carrier frequencies bearing an odd harmonic relationship to a common "base" frequency, a two-tone telegraph system may be constructed, using separate sources of carrier current for mark and space frequencies, which will show satisfactorily low signal distortion if the mark and space frequencies are so chosen that they are separated by an interval sufficient to prevent appreciable direct overlap of sidebands and so that third order products of modulation of the signal sidebands emerging from the limiter lie outside the bands of the discriminator filters placed between the limiter and the demodulator. This assumes that the limiter is a symmetrical device so that substantially only odd order products of modulation are produced. However, if the mark and space frequencies are exact odd multiples of each other and are held in step with each other by an automatic lock-in device, the distortion (other than a constant bias) will still be low in spite of any modulation products reaching the demodulator so long as the mark and space frequencies are sufficiently separated to avoid direct sideband overlap.

Although the invention has been described with reference to particular embodiments and numerical values, it is to be understood that the invention is not limited to these specific embodiments or values, since other embodiments and modifications will readily occur to one skilled in the art.

What is claimed is:

1. In a two-tone carrier communication system means comprising a first carrier source for transmitting marking signals, a second carrier source for transmitting spacing signals, and a receiver including a common current limiter for limiting said carriers and filtering means for separating said marking and spacing signals at the output of said limiter, said first and second carriers having frequencies bearing an odd harmonic relation to a common base frequency and being separated in frequency so that marking and spacing signal sidebands associated with either carrier at the output of said limiter will be sufficiently attenuated by the filtering means designed to accept the spacing and marking signals, respectively so as to have an unappreciable effect on the shaping of the spacing and marking signals, respectively.

2. The combination in accordance with claim 1 wherein said filtering means comprise means for passing said marking and spacing signals and means for suppressing third order modulation products arising from intermodulation in said limiter of said marking and spacing signals.

3. In a two-tone carrier system employing different frequencies for spacing and marking signals and employing filters for separating the marking signals from the spacing signals, the method comprising pairing a marking frequency with a spacing frequency sufficiently separated from said marking frequency to prevent the sidebands representing the marking and spacing signals from overlapping the pass-bands of the spacing and marking filters, respectively, to an appreciable extent and to prevent third order modulation products resulting from intermodulation of the signal sidebands from overlapping the pass-band of either of said filters to an appreciable extent.

4. In a two-tone carrier communication system employing a marking carrier of a first frequency for mark signals and a spacing carrier of a second frequency for space signals, means for transmitting said mark and space signals as sidebands of their respective carriers, a receiver including means for receiving said mark and space signals, a common current limiter, frequency discriminator means having pass bands which embrace said mark and space signals connected to the output of said limiter and means for applying the received mark and space signals to said limiter whereby the output of said limiter includes the limited mark and space signals and distortion in the form of modulation products resulting from the intermodulation in said limiter of said mark and space signals, said first and second frequency being odd harmonics of a common base frequency and said frequency discriminator means comprising a first filter having a pass band region embracing said mark signals to the exclusion of said space signals and a second filter having a pass band region embracing said space signals to the exclusion of said mark signals.

5. The combination in accordance with claim 4 wherein said carriers are separated in frequency with respect to the pass band regions of said filters to throw said modulation products which are of the third order outside said pass band regions.

References Cited in the file of this patent

UNITED STATES PATENTS

| Number | Name | Date |
|---|---|---|
| 2,154,921 | Vroom | Apr. 18, 1939 |
| 2,370,985 | Morrison | Mar. 6, 1945 |
| 2,406,034 | Phelps | Aug. 20, 1946 |
| 2,461,956 | Beckwith | Feb. 15, 1949 |
| 2,477,963 | Chapin | Aug. 2, 1949 |